US007080806B2

(12) United States Patent
Mills

(10) Patent No.: US 7,080,806 B2

(45) Date of Patent: Jul. 25, 2006

(54) OVERHEAD SPACE ACCESS CONVERSION MONUMENT AND SERVICE AREA STAIRCASE AND STOWAGE SYSTEM

(75) Inventor: Christopher J. Mills, Everett, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/708,810

(22) Filed: Mar. 26, 2004

(65) Prior Publication Data

US 2005/0224646 A1 Oct. 13, 2005

(51) Int. Cl.
*B64D 11/00* (2006.01)

(52) U.S. Cl. ................................ 244/118.1; 244/118.5; 312/247; 182/88

(58) Field of Classification Search ............. 244/118.1, 244/118.5, 118.6, 117 R, 119, 129.6; 52/183; 182/88, 35; 312/246–247; 105/315, 345
See application file for complete search history.

(56) References Cited

U.S. PATENT DOCUMENTS 670,763 A 3/1901 Brodeur
675,916 A * 6/1901 Youtsey ...................... 105/449
936,681 A 10/1909 Union
1,427,588 A * 8/1922 Greenison .................... 182/21
1,439,030 A 12/1922 Stahl
1,770,066 A 7/1930 Christophel
1,802,401 A 4/1931 Bessler
1,811,708 A 6/1931 Bessler
1,867,904 A 7/1932 Bessler
1,930,922 A 10/1933 Burnelli
2,364,094 A * 12/1944 Parke et al. ................ 105/315
D147,745 S 10/1947 Dorrier
2,455,157 A 11/1948 Bigelow
2,531,263 A 11/1950 Fink
2,564,954 A * 8/1951 Brelsford ..................... 52/183
2,815,159 A 12/1957 Harmon
2,840,289 A 6/1958 Murray
2,933,149 A 4/1960 Lee
2,931,456 A 8/1960 Harmon
2,990,148 A 6/1961 James
3,144,224 A 8/1964 Carroll
3,670,848 A 6/1972 Raiguel, Jr.
3,701,396 A 10/1972 House
3,842,935 A 10/1974 Frank
3,894,614 A * 7/1975 Naka ........................... 182/78
3,901,353 A 8/1975 Skolnik
3,941,337 A 3/1976 Molter et al.
3,985,202 A 10/1976 Harmon
4,014,486 A 3/1977 Nelson et al.
4,022,404 A 5/1977 Greiss
4,053,140 A 10/1977 Clemens et al.

(Continued)

FOREIGN PATENT DOCUMENTS

EP 1 279 592 A2 1/2003

*Primary Examiner*—Galen Barefoot
(74) *Attorney, Agent, or Firm*—Ostrager Chong Flaherty & Broitman P.C.

(57) ABSTRACT

An overhead area access staircase stowage system (7) includes a servicing unit (10) having a stowage unit and a staircase (12) proximate to the stowage unit. The staircase (12) has a stowed state (18) and a deployed state (20). The staircase (12) includes multiple stair elements (40) and a state actuating system (60). The state actuating system (60) transitions the stair elements (40) between the stowed state (18) and the deployed state (20).

39 Claims, 3 Drawing Sheets

U.S. PATENT DOCUMENTS 4,055,317 A * 10/1977 Greiss .................... 244/118.5
4,066,227 A 1/1978 Buchsel
4,139,077 A * 2/1979 Pena, Jr. ..................... 182/35
4,179,996 A * 12/1979 Gutridge et al. ........... 105/345
4,315,389 A 2/1982 Loix
4,456,414 A 6/1984 Williams
RE32,176 E 6/1986 Vernon
4,653,707 A 3/1987 Hamilton et al.
4,660,787 A 4/1987 Sprenger et al.
4,669,574 A 6/1987 Moutot
4,686,908 A 8/1987 Legrand
4,736,910 A 4/1988 O'Quinn et al.
4,742,888 A 5/1988 Amacker
4,805,859 A 2/1989 Hudson
5,050,706 A 9/1991 Cole et al.
5,111,906 A 5/1992 Abadia
5,115,999 A 5/1992 Buchsel et al.
5,143,324 A 9/1992 Cornelius et al.
5,159,994 A 11/1992 Luria
5,174,411 A 12/1992 Oliver et al.
5,205,515 A 4/1993 Luria
5,299,653 A 4/1994 Nebel
5,314,143 A 5/1994 Luria
5,322,244 A 6/1994 Dallmann et al.
5,395,075 A * 3/1995 Sprenger et al. ......... 244/118.5
5,397,143 A 3/1995 Bird
5,474,260 A * 12/1995 Schwertfeger et al. ... 244/118.5
5,496,000 A 3/1996 Mueller
5,518,207 A 5/1996 Nordstrom et al.
5,575,439 A 11/1996 Heinze et al.
5,727,654 A 3/1998 Roessner et al.
5,759,005 A 6/1998 Roessner et al.
5,784,836 A 7/1998 Ehrick
5,992,797 A 11/1999 Seidel et al.
6,003,813 A 12/1999 Wentland et al.
6,056,239 A 5/2000 Cantu et al.
6,059,229 A 5/2000 Luria
6,073,883 A * 6/2000 Ohlmann et al. ........ 244/118.5
6,152,400 A 11/2000 Sankrithi et al.
6,182,926 B1 2/2001 Moore
6,290,181 B1 9/2001 Gadd et al.
6,305,643 B1 * 10/2001 Sankrithi ................ 244/118.1
6,305,645 B1 10/2001 Moore
6,340,136 B1 1/2002 Luria
6,390,325 B1 5/2002 Gonzales
6,412,603 B1 7/2002 Nervig et al.
6,425,457 B1 7/2002 Lundry
6,454,208 B1 9/2002 Nervig et al.
6,464,169 B1 * 10/2002 Johnson et al. .......... 244/118.5
6,520,451 B1 * 2/2003 Moore .................... 244/118.5
6,547,183 B1 4/2003 Farnsworth
6,581,876 B1 6/2003 Cheung
6,616,098 B1 * 9/2003 Mills ...................... 244/118.5
6,659,225 B1 12/2003 Olliges et al.
6,663,043 B1 12/2003 Luria
6,679,334 B1 1/2004 Johnson et al.
6,739,100 B1 5/2004 Lewandowski
6,808,142 B1 10/2004 Oki
6,866,118 B1 3/2005 Battenberg
6,886,661 B1 5/2005 Battenberg
2003/0019976 A1 * 1/2003 Cheung .................. 244/118.5
2003/0025036 A1 2/2003 Farnsworth
2004/0188564 A1 9/2004 Boe et al.
2005/0029042 A1 2/2005 Latimer et al.
2005/0029044 A1 2/2005 Latimer et al.

* cited by examiner

OVERHEAD SPACE ACCESS CONVERSION MONUMENT AND SERVICE AREA STAIRCASE AND STOWAGE SYSTEM

BACKGROUND OF INVENTION

The present invention is related generally to aircraft stowage systems. More particularly, the present invention is related to stowage systems and their conversion to enable access to various overhead areas of an aircraft.

Space within a crown of a wide body aircraft is typically not efficiently or fully utilized, due to the loss of main deck space in access thereof. In order to maximize stowage and seating area within a commercial passenger aircraft, efficient use of space within the aircraft is desired. Efficient use of aircraft space can increase the number of passengers transported per flight and the capability of an aircraft to store more items on board.

Increased efficiency of space usage not only increases physical capacity of an aircraft, but can also increase customer and crewmember satisfaction and revenue per flight. For example, and particularly with respect to long flights, additional space allows for increased stowage of food, baggages, and other items of various sizes. Improved efficiency of space usage also provides increased space for passenger and crewmember seating, rest areas, and movement about the aircraft.

In larger aircrafts that are typically used for longer flights, overhead space modules, such as crew rest stations and additional stowage compartments, are provided in the space between the curved top portion of the hull of the aircraft and the lowered ceiling of the aircraft. These overhead space modules are typically accessible through a dedicated stairway module with corresponding loss of main deck space. As a result, overhead space usage has been limited to large commodities, such as crew rests, that may be relocated. The relocation of the large commodities provides more main deck space than is required for access thereof.

Thus, there exists a need for an improved access mechanism for access to overhead areas of an aircraft that is space efficient, cost effective to manufacture and implement, and easy and convenient to utilize and operate.

SUMMARY OF INVENTION

One embodiment of the present invention provides an overhead area access staircase stowage system that includes a servicing unit having a stowage unit and a staircase proximate to the stowage unit. The staircase has a stowed state and a deployed state. The staircase includes multiple stair elements and a state actuating system. The state actuating system is used to transition the stair elements between the stowed state and the deployed state.

The embodiments of the present invention provide several advantages. One such advantage is the provision of an overhead area access staircase stowage system that is convertible between a stowage unit and a staircase. In so providing, the stated embodiment provides efficient usage of an aircraft space by allowing for crewmembers to stow objects, such as galley carts, during Taxi, Takeoff, and Landing and to access overhead areas during flight.

A couple of other advantages provided by multiple embodiments of the present invention are the provisions of staircases that can be stowed within a stowage space, a ceiling, or a floor of a vehicle or structure.

Another advantage provided by an embodiment of the present invention is the provision of an aircraft service cart area that incorporates an overhead area access staircase and stowage system. As such, the stated embodiment provides increased space efficiency of service cart and corresponding overhead areas.

Yet other advantages that are provided by embodiments of the present invention are the provisions of overhead area access staircase stowage systems that incorporate staircases with platform members and stowage modules for easy performance of various tasks related to the servicing of an aircraft and increased stowage capability of service areas.

The embodiments of the present invention also provide various devices and mechanisms for transitioning overhead area access staircase and stowage systems between stowed states and deployed states.

The present invention itself, together with further objects and attendant advantages, will be best understood by reference to the following detailed description, taken in conjunction with the accompanying drawing.

DETAILED DESCRIPTION

Figure 1A:
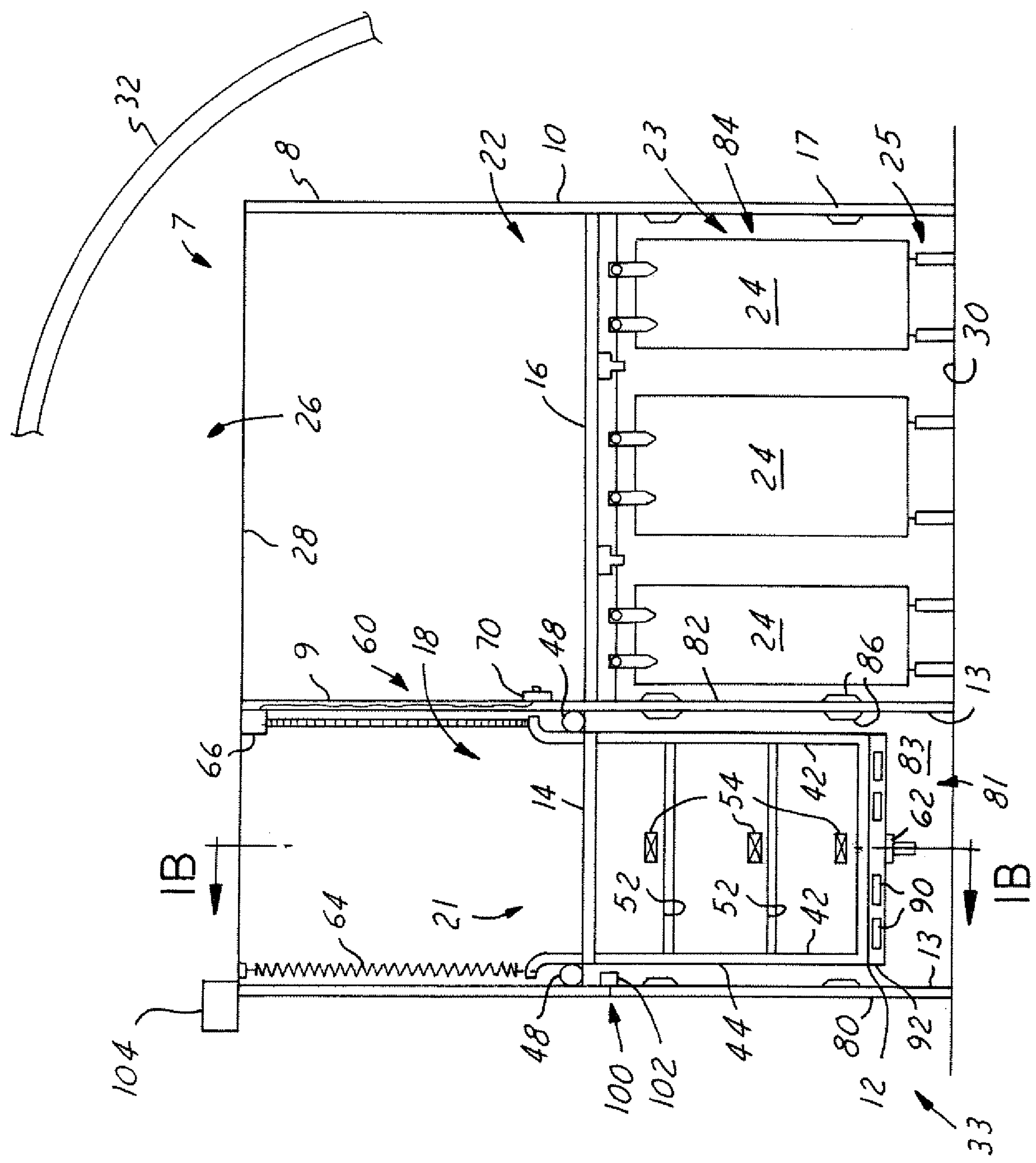
FIG. 1A is a front view of an aircraft service area incorporating an overhead area access staircase and stowage system in accordance with an embodiment of the present invention.

In the following Figures the same reference numerals will be used to refer to the same components. While the present invention is described primarily with respect to overhead area access staircase and stowage systems for use within an aircraft, the present invention may be adapted and applied in various vehicle and non-vehicle applications. The present invention may be applied in aeronautical applications, nautical applications, railway applications, automotive vehicle applications, and commercial and residential applications, as well as in other applications known in the art where space is limited and efficient use thereof is desired. Also, the staircase and stowage systems of the present invention may be utilized to access overhead areas, to access rest areas, to access various service areas, to ascend or descend between floors, or for other purposes known in the art.

In the following description, various operating parameters and components are described for one constructed embodiment. These specific parameters and components are included as examples and are not meant to be limiting.

Also, in the following description the term “object” may refer to any object that may be stored or stowed. An object, for example, may include food, utensils, condiments, baggages, tools, bedding linens, pillows, strollers, or various other objects that may be stored or stowed in a structure.

Figure 1B:
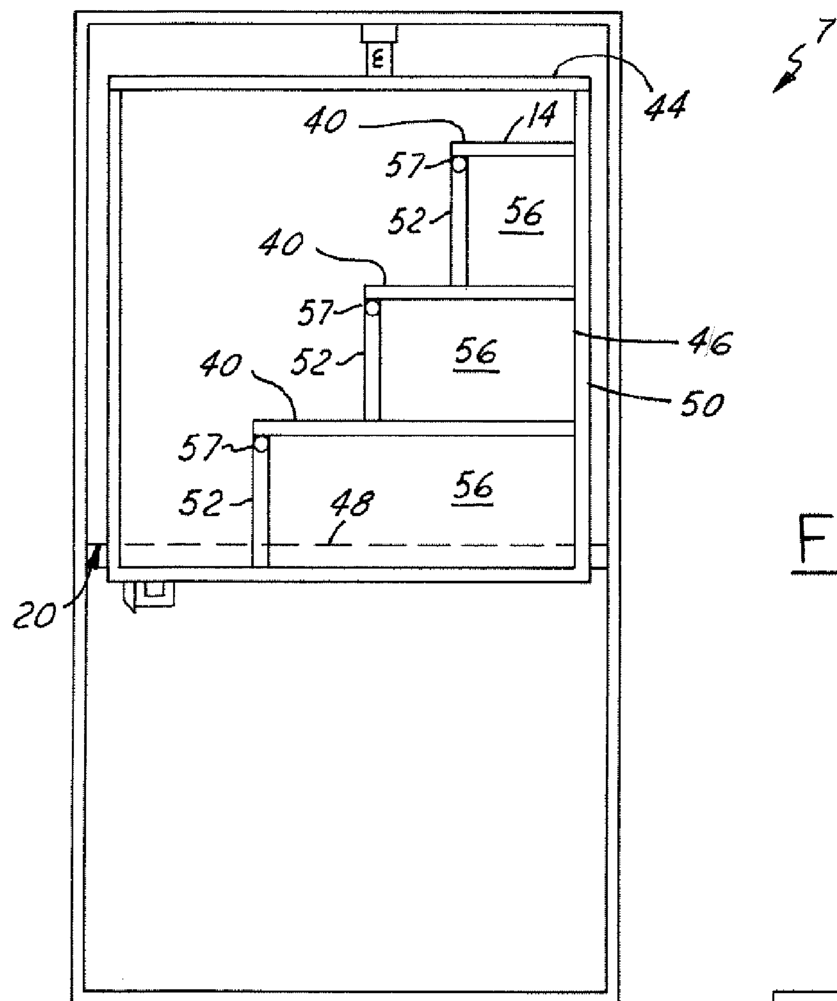
FIG. 1B is a cross-sectional side view of a staircase of the overhead area access staircase and stowage system of FIG. 1A taken along sectional line 1B.
Figure 1C:
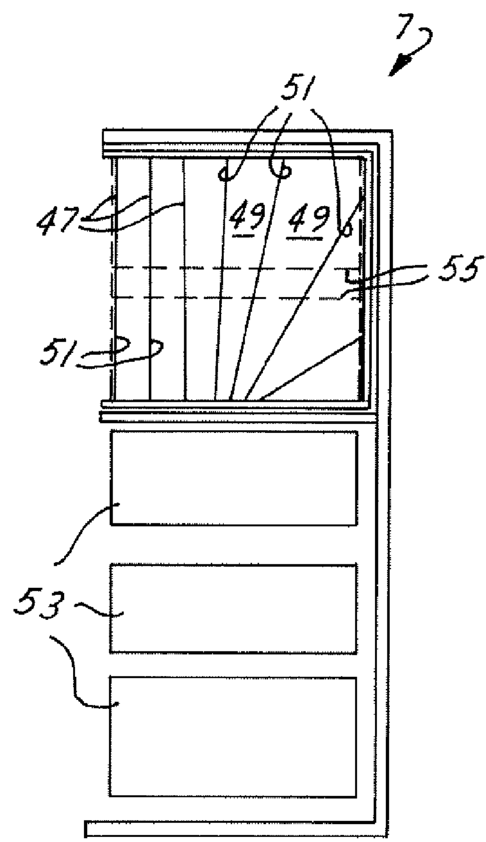
FIG. 1C is a top view of the overhead area access staircase and stowage system of FIG. 1A.

Referring now to FIGS. 1A–C, a front view, a cross-sectional side view, and a top view of an aircraft service area 6 incorporating an overhead area access staircase stowage monument or stowage system 7, are shown in accordance with another embodiment of the present invention. The staircase and stowage system 7 includes a servicing unit 8 having a first portion 9 and a second portion 10. The first portion 9 has a staircase 12 that resides between a pair of section dividers 13. The first portion 9 includes a first platform member 14 and the second portion 10 includes a second platform member 16 and a divider 17. The staircase 12 is shown in a deployed state 18 in FIG. 1A and in a stowed state 20 in FIG. 1B. The staircase 12 and the platform 16 reside within a first staging area 21 and a second staging area 22, respectively.

When stowed, the majority of the staircase 12 resides at a level above the platform 14 and above a cart level 23. When deployed, the staircase 12 resides at a level substantially below the platforms 14 and 16 or at the cart level 25 and may be used to access the overhead area 26. The staircase 12 may be used to store various objects. Although the staircase 12 is shown as having a deployed state 18 directly below the platform 14 and a stowed state 20 directly above the platform 14, the staircase 12 may be easily modified to be stowed into a space above a ceiling 28 or into a space below a floor 30 of the aircraft 32. Also, although the stowage system 7 is shown within the servicing unit 10, which is in the form of a galley, it may be located within other servicing units known in the art. The stowage system 7 may be located to the right of an aisle 33, as shown, or may be in various other locations within the aircraft 32.

A pair of service carts 34 is removed from below the staircase 12 before deployment thereof. The service carts 34 may be returned or stowed below the staircase 12 when the staircase is stowed.

The staircase 12 includes stair elements 40, coupled between vertical portions 42 of a U-shaped stair support member 44, and stowage modules 46, which reside between the stair elements 40. Note that the platform 14 may be used to perform staging tasks or may serve as a stair element to access the overhead area 26, as shown. The U-shaped member 44 slides and is guided on rollers 48 when transitioned between the deployed state 18 and the stowed state 20.

The stair elements 40 may be of various sizes, shapes, and may be formed of various materials. The stair elements 40 may include parallel adjacent step elements 47 and angled adjacent step elements 49. The angled step elements 49 allow crewmembers to rotate towards a given area while remaining faced in a physically oriented direction that is perpendicular to step edges 51. This may, for example, allow ease in accessing areas above laterally adjacent carts, such as carts 53, as opposed to areas over or directly in front of carts 55.

The stowage modules 46 are enclosed by the stair elements 40, the U-shaped member 44, a back member 50, and access panels 52. The access panels 52 may have handles 54 and may be rotated on hinges 57 and slid into the stowage spaces 56. The access panels 52 and the hinges 57 may also be considered stair elements. Other stair elements known in the art may also be incorporated into the staircase 12 and the stowage modules 46.

The staircase 12 also includes a state actuating system 60, which is used to transition the staircase 12 between the deployed state 18 and the stowed state 20. When in a manual operating arrangement, the state actuating system 60 may include a deployment handle 62 and a potential energy device 64. When in an automated operating arrangement, the state actuating system 60 may include a motor 66 and a drive gear 68 coupled between the U-shaped member 44 and the motor 66. The staircase 12 may be raised and lowered via an actuation switch 70 coupled to the motor 66.

Although the potential energy device 64 is shown as a spring, it may be in various forms. The potential energy device 64 assists transition of the staircase 12 between the deployed state 18 and the stowed state 20. Any number of potential energy devices may be utilized. The potential energy device 64 may be coupled to the U-shaped member 44, as shown, or may be incorporated using some other technique known in the art.

The dividers 16 include a first divider 80 and a second divider 82. The second divider 82 separates the staircase 12 that may be within a first service cart stowage area 81 of a first stowage unit 83 from a second service cart stowage area 84 of a second stowage unit or a service cart stowage unit 85. The dividers 16 may include cart bumpers 86. Any number of cart bumpers 86 may be utilized. The cart bumpers 86 guide the service carts 24 into the cart stowage areas 83 and 84 and prevent damage to the dividers 16.

The platform 16 and the base 92 of the staircase 12 may have multiple service cart retainers 90 coupled thereto that are used to prevent the carts 24 from rolling out of the cart areas 83 and 84 when stowed. The retainers 90 may be in the form of quarter-turns, paddles, or may be in some other form known in the art. The retainers 90 may also be coupled to a base 92, which is in turn coupled to the U-shaped member 44.

The staircase 12 may also include a release mechanism 100. The release mechanism 100 may include a lever 102 to retain the staircase 12 in the stowed state 12 until desired deployment thereof. The lever 102 may be coupled to the first divider 80, as shown, and may be manually rotated or rotated via the actuator 104. Although the staircase 12 is shown as being located to the left of the second divider 82, it may be located to the right of the divider 82. The staircase 12 may be deployed and stowed in various locations. In one embodiment of the present invention, the staircase 12 is stowed above the ceiling 28. In another embodiment of the present invention, the staircase has a variable height deployed state such that the vertical position of the staircase 12 may be adjusted as desired for access to the overhead area 26.

In accessing the overhead area 26 the staircase 12 is accessed within the first stowage unit 83 and released using the release mechanism 100. The staircase 12 is deployed within the first stowage unit 83. The staircase 12 or stair elements 40 are released to allow vertical movement thereof. The staircase is glided and supported on the guides 48 down to a service cart level 25. A crewmember ascends the stair elements 40 and interacts with objects in the overhead area 26. Upon descent of the stair elements 40, the crewmember may then stow the staircase 12.

Figure 2A:
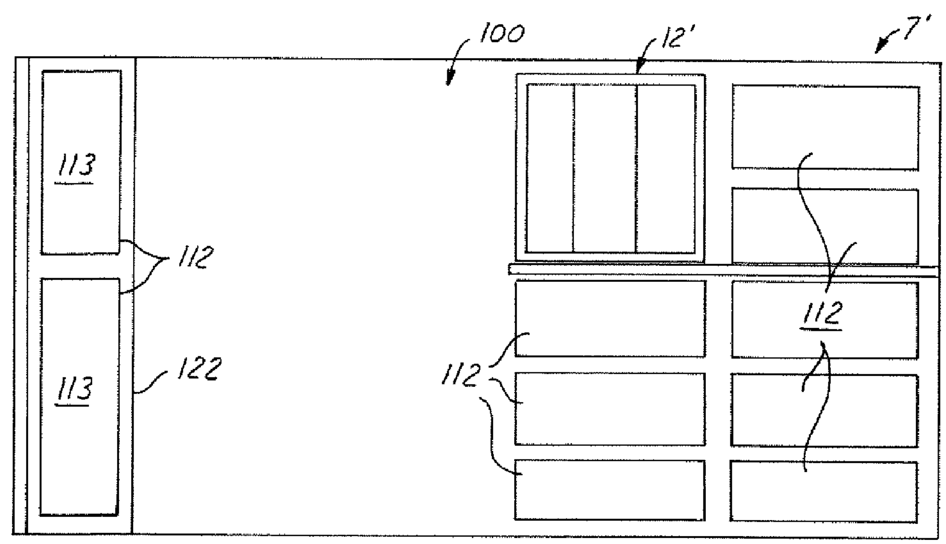
FIG. 2A is a top view of a dual cart service area incorporating an overhead area access staircase and stowage system in accordance with another embodiment of the present invention.
Figure 2B:
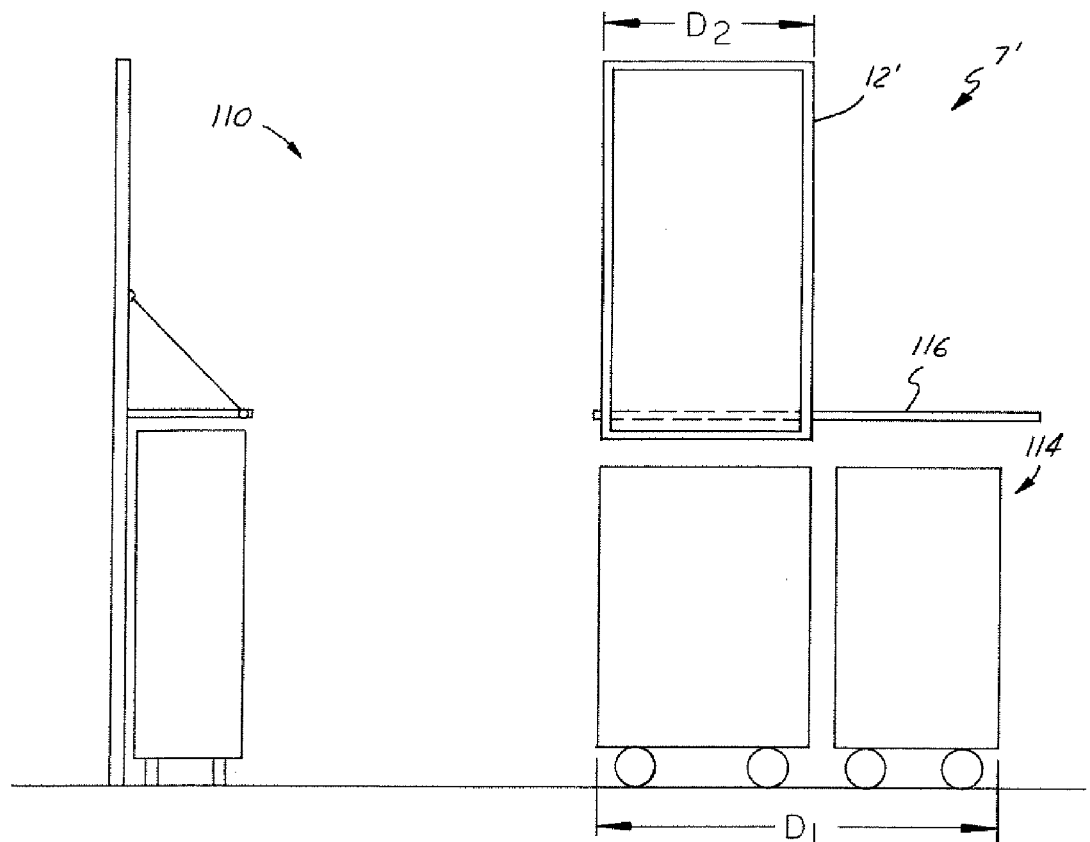
FIG. 2B is a side view of the dual cart service area of FIG. 2A.

Referring now to FIGS. 2A–B, a top view and a side view of a dual cart service area 110, incorporating an overhead area access staircase stowage system 7", are shown in accordance with another embodiment of the present invention. The dual cart service area 110, as shown, includes ten service carts 112. A stowage area 112 is shown having a two-cart depth $D_1$ below a platform 113. The service carts 112 are stowed below the platform 113 in a "two deep" arrangement. Two carts 113 may be removed from the staging area 112 and temporarily stowed beneath a worktable 122 to allow the deployment or lowering of the staircase 12". In this configuration the staircase 12" may be used to access areas above any of the service carts 112.

Even though the staircase 12" is shown as having a single cart depth $D_2$, the staircase 12" may be easily modified to have a two-cart depth or a depth that is approximately equal to the staging area depth $D_1$. In an example embodiment, the single cart depth $D_2$ is approximately 40 inches or the depth of a single service cart, which is deeper than the depth of a majority of traditional overhead access stairways. The embodiment of FIGS. 2A–B in allowing for increased service cart depth provides a crewmember with greater ease in accessing overhead areas. The increased staircase depth reduces incline of stair or step elements within the staircase and also allows for increased depth of stowage modules contained therebetween.

The above-described staircase systems although described as being manually or electrically actuated, may also be hydraulically or pneumatically actuated, using techniques known in the art.

The present invention provides stowage systems that provide access to overhead areas through conversion thereof. The stowage systems include staircases that can be conveniently stowed in a compact arrangement within a stowage area or at various levels, such as above a service cart level. The present invention may be applied in various applications and provides efficient use of space and increased stowage ability.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. An overhead area access staircase stowage system comprising:

at least one servicing unit comprising;

at least one stowage unit; and a staircase proximate to said at least one stowage unit and having a stowed state and a deployed state, said staircase comprising;

a plurality of stair elements; and a state actuating system transitioning said stair elements between said stowed state and said deployed state within a single deck;

said staircase comprising at least one stowage module accessible in both said deployed state and said stowed state.

2. A staircase stowage system as in claim 1 wherein said servicing unit comprises:

a first portion comprising;

a first stowage unit; and said staircase; and a second portion comprising a second stowage unit.

3. A staircase stowage system as in claim 2 wherein said first portion comprises a platform member corresponding with a staging area.

4. A staircase stowage system as in claim 3 wherein said platform member is a stair element of said staircase.

5. A staircase stowage system as in claim 2 wherein said second portion comprises a platform member corresponding with a staging area.

6. A staircase stowage system as in claim 1 further comprising at least one divider separating stowage units of said at least one stowage unit.

7. A staircase stowage system as in claim 6 wherein said at least one divider separates said staircase and said at least one stowage unit.

8. A staircase stowage system as in claim 1 further comprising a plurality of cart bumpers coupled to said at least one divider.

9. A staircase stowage system as in claim 1 further comprising a plurality of cart bumpers coupled to said at least one stowage unit and guiding stowage of at least one service cart.

10. A staircase stowage system as in claim 1 wherein said at least one stowage module resides between stair elements of said plurality of stair elements.

11. A staircase stowage system as in claim 1 wherein said staircase comprises at least one access panel coupled to said plurality of stair elements and allowing access to said at least one stowage module.

12. A staircase stowage system as in claim 1 wherein said state actuating system comprises:

a plurality of rollers;

a U-shaped stair support member transitioning between states on said plurality of rollers;

a potential energy device coupled to said U-shaped stair support member and assisting transition of said staircase between said stowed state and said deployed state.

13. A staircase stowage system as in claim 12 wherein said rollers guide transition of and support said staircase.

14. A staircase stowage system as in claim 12 further comprising at least one service cart retainer coupled to said U-shaped stair support member.

15. A staircase stowage system as in claim 1 further comprising at least one service cart retainer coupled to said staircase.

16. A staircase stowage system as in claim 1 further comprising at least one release mechanism allowing actuation of said staircase.

17. A staircase stowage system as in claim 1 wherein said state actuating system comprises a deployment handle.

18. A staircase stowage system as in claim 1 wherein said state actuating system comprises a motor.

19. A staircase stowage system as in claim 1 wherein said plurality of stair elements have a plurality of shapes.

20. A staircase stowage system as in claim 1 wherein said staircase further comprises at least one staging element.

21. A staircase stowage system as in claim 1 wherein said staircase is deployable from at least one of a ceiling and a floor.

22. A staircase stowage system as in claim 1 wherein said staircase has a stowed state substantially above a service cart level and a deployed state substantially at said service cart level.

23. A staircase stowage system as in claim 1 wherein said at least one servicing unit is approximately one or more service carts deep.

24. A staircase stowage system as in claim 1 wherein said staircase is approximately one or more service carts deep.

25. A staircase stowage system as in claim 1 wherein said at least one servicing unit comprises:

at least one platform member; and at least one worktable.

26. A staircase stowage system as in claim 1 wherein said plurality of stair elements comprises:

parallel step elements; and angled step elements.

27. An aircraft comprising an aircraft structure having at least one overhead area, and a staircase stowage system according to the claim 1.

28. An aircraft as in claim 27 wherein said at least one stowage module resides between stair elements of said plurality of stair elements.

29. An aircraft as in claim 27 wherein said staircase system further comprises a service cart storage unit.

30. An aircraft as in claim 27 wherein said overhead area has a multiple service cart depth.

31. An Aircraft comprising:

a galley comprising;

at least one stowage unit; and a staircase proximate to said at least one stowage unit and having a stowed state and a deployed state, said staircase comprising;

a stair support member;

a plurality of stair elements vertically fixed in position relative to said stair support member; and a state actuating system transitioning said stair support member and said stair elements between said stowed state and said deployed state;

said staircase vertically and non-rotatably actuated between states.

32. An aircraft as in claim 31 wherein said at least one stowage unit comprises at least one service cart stowage unit.

33. An overhead area access staircase stowage system comprising:

at least one service cart stowage unit;

at least one stowage module; and a staircase proximate to said at least one service cart stowage unit, coupled to said at least one stowage module, and having a stowed state and a deployed state, said staircase comprising;

a plurality of stair elements;

a sate actuating system transitioning said stair elements between said stowed state and said deployed state; and a staging area platform corresponding to at least one said stair elements and vertically aligned with a service cart stowage unit platform when deployed.

34. A staircase stowage system as in claim 33 wherein said staircase is deployable within said at least one stowage unit and comprises said at least one stowage module.

35. A method of accessing an overhead area and stowing objects within a stowage unit of an aircraft comprising:

accessing a staircase within a stowage unit;

releasing said staircase;

deploying said staircase within said stowage unit comprising;

vertically and non-rotatably translating a plurality of stair elements that are vertically fixed in position relative to each other; and supporting said plurality of stair elements;

ascending said plurality of stair elements;

interacting with the overhead area; and stowing said staircase.

36. A method as in claim 35 further comprising stowing objects within said staircase.

37. A method as in claim 35 further comprising retaining service carts within said stowage unit.

38. A method as in claim 37 wherein retaining service carts comprises the rotation of retainers coupled to at least one of a staircase base and a staging area platform member.

39. A method as in claim 35 further comprising stowing at least one service cart below at least one of a worktable and a platform member before deploying said staircase.

* * * * *